United States Patent [19]

Moreno

[11] Patent Number: 4,514,107
[45] Date of Patent: Apr. 30, 1985

[54] DEVICE FOR JOINING TUBULAR MEMBERS

[76] Inventor: Gil G. Moreno, 4106 Dellbrook Dr., Tampa, Fla. 33624

[21] Appl. No.: 498,022

[22] Filed: May 25, 1983

[51] Int. Cl.³ .............................................. F16B 7/08
[52] U.S. Cl. .................................. 403/230; 403/237; 403/247
[58] Field of Search ..................... 52/638, 697, 223 R; 182/179, 216; 403/190, 191, 237, 234, 252, 167, 247, 254, 255, 256, 258, 259, 264; 5/280, 282 B, 283

[56] References Cited

U.S. PATENT DOCUMENTS

| 911,863 | 2/1909 | Adams | 5/283 R |
|---|---|---|---|
| 1,061,487 | 5/1913 | Moore | 5/280 |
| 1,972,997 | 9/1934 | Junkers | 403/237 |
| 3,233,871 | 2/1966 | Schroer | 403/191 X |
| 4,146,342 | 3/1979 | Cederholm | 403/247 |

FOREIGN PATENT DOCUMENTS

| 819147 | 10/1951 | Fed. Rep. of Germany | 403/190 |
|---|---|---|---|
| 384769 | 12/1932 | United Kingdom | 403/234 |

Primary Examiner—Dennis L. Taylor
Attorney, Agent, or Firm—Frijouf, Rust & Pyle

[57] ABSTRACT

A device for joining tubular members of any cross section is disclosed. Typically, two parallel tubes are joined by a transverse tube. A rod is centered inside the transverse tube by a washer disposed at each end of the transverse tube. The rod may be threaded directly to one of the parallel tubes or to a reinforcing sleeve placed inside one of the parallel tubes. The other end of the rod has a small protuberance or head that is passed through an aperture in the wall of the other parallel tube. A wedge provided with a longitudinal slot, open at the thinner end of the wedge, is forced to engage with the head of the rod. The slot of the wedge is of a width slightly greater than the diameter of the rod such that the slot is easily engaged by the rod. The rod is subjected to tension stress and the transverse tube is subjected to compression stress. A rigid structure is provided having a smooth external joint, the fastening means being wholly disposed within the tubular members. The present invention has particular utility with reference to the joining of tubular bed frame members.

9 Claims, 7 Drawing Figures

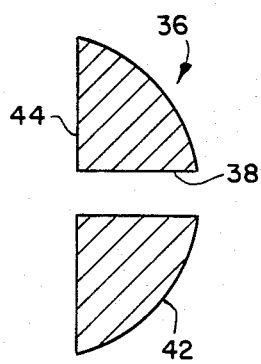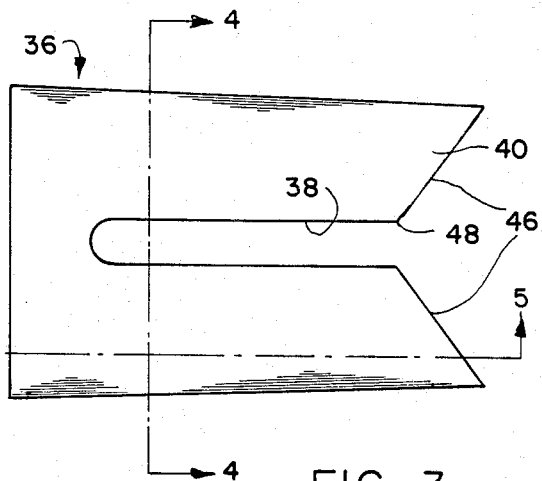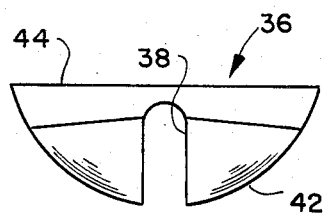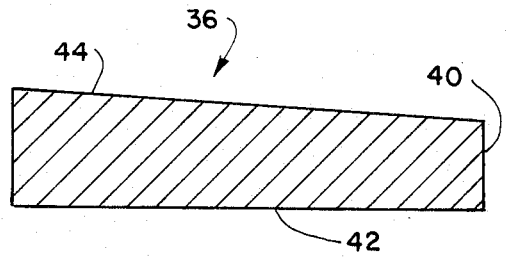

DEVICE FOR JOINING TUBULAR MEMBERS

BACKGROUND OF THE INVENTION

1. Field of the Invention

This invention relates to a device for joining together tubular members. More specifically, this invention relates to a device for joining tubular bed frame members.

2. Information Disclosure Statement

In previous techniques to joint tubular members, two parallel tubes are joined by a transverse tube. A rod is centered in the transverse tube by a washer disposed at each end of the transverse tube. A slot is provided at one end or at both ends of the rod. The slotted ends of the rod penetrate into the parallel tubes and a wedge is forced in each slot of the rod. In thin wall tubes, the rigidity of the joint is in direct proportion to the bearing surface between the wedge and the inner surface of the parallel tubes and it is in inverse proportion to the area of the hole of the parallel tube through which the rod penetrates. In order to use holes of small area in the parallel tubes and at the same time accomplish large bearing surface between the wedge and the inner surface of the parallel tube, a washer is interposed between the wedge and the inner surface of the parallel tube. It is obvious that placing the washer over the rod is not an easy task when the rod is at a relatively long distance from the end of the parallel tube. Furthermore, after the washer is in place, the insertion of the wedge in the slot becomes more difficult because the wedge cannot slide on the inner surface of the parallel tube.

U.S. Pat. No. 911,863 to Adams discloses a metal bed frame in which a plug disposed within a transverse tube includes a spigot which extends through a hole in one of the parallel tubes. The spigot defines a slot for the reception of a wedge.

U.S. Pat. No. 1,061,487 to Moore, teaches a one-piece rod which extends through a hole in one of the parallel tubes. The rod defines a slot which is disposed radially to the center of the parallel tube. The transverse tube is locked to the parallel tube by means of a wedge which cooperates with the slot.

Although the prior art devices provide a joint having a smooth external surface, they suffer from a certain lack of rigidity because the bearing surface of the wedge relative to the internal surface of the parallel tube or alternatively, an intervening bearing washer was relatively small. It is the primary object of the present invention to provide a device for joining tubular members that overcomes the aforementioned inadequacies of the prior art devices and provides an improvement which significantly contributes to the rigidity and ease of assembly of cooperating tubular members.

Another object of the present invention is the provision of a wedge which defines a longitudinal slot, the slot cooperating with a rod which extends through a transverse tube and through a hole defined by a second tube angularly disposed relative to the transverse tube.

Another object of the present invention is the provision of a device for joining angularly disposed tubes which is both economical to produce and easy to assemble.

The foregoing has outlined some of the more pertinent objects of the present invention. These objects should be construed to be merely illustrative of some of the more pertinent features and applications of the invention. Many other beneficial results can be attained by applying the disclosure of the invention in a different manner or modifying the invention within the scope of the disclosure. Particularly with regard to the use of the invention disclosed herein, this should not be construed as limited to joining tubular bed frame members, but should include a device for joining together any angularly disposed tubular members.

SUMMARY OF THE INVENTION

The device for joining together two angularly disposed tubular members is defined by the appended claims with a specific embodiment shown in the attached drawing. For the purpose of summarizing the invention, a device for joining together two parallel tubes by a transverse tubular member includes a rod centered inside the transverse tubular member by a washer disposed at each end of the rod. One end of the rod is threaded to one of the parallel tubes or to a sleeve placed inside the parallel tube. The other end of the rod is provided with a protuberance or head. The head of the rod is introduced into the inside of the other parallel tube through a hole disposed in the wall of the parallel tube. A wedge with a longitudinal slot open at the thinner end of the wedge and having a slot width slightly greater than the diameter of the rod is forced into engagement with the rod. The engagement of the wedge and rod is accomplished by simply sliding the wedge inside the parallel tube with the opening of the slot facing the rod and then pushing the wedge against the rod by which action the rod is subjected to a tension stress and the transverse tube is subjected to a compression stress. Any shape of tube can be joined with the device of the present invention.

In a more specific embodiment of the present invention, the wedge has one longitudinal surface which conforms to the internal profile of the parallel tubular member with which it cooperates. The open end of the slot terminates in a V-shaped guide which facilitates guidance of the rod into the longitudinal slot.

In an alternative embodiment of the present invention, the head comprises two interengaging nuts which cooperate with each other to lock relative the rod and collectively form the head.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other devices for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following description taken in conjunction with the accompanying drawings in which:

FIG. 3 is a view of the wedge from the sloping wedge surface;

FIG. 4 is a sectional view of the wedge taken on the line 4—4 of FIG. 3;

FIG. 5 is a sectional view of the wedge taken on the line 5—5 of FIG. 3; and

FIG. 6 is an end view of the wedge taken from the thinner end of the wedge.

Similar reference characters refer to similar parts throughout the several views of the drawings.

DETAILED DESCRIPTION

Figure 1:
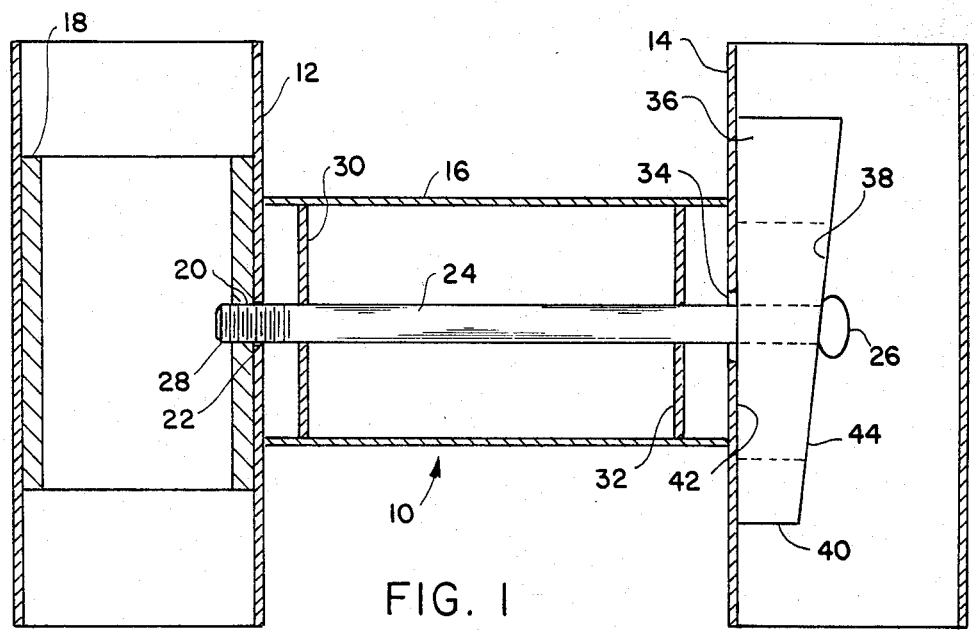
FIG. 1 is a cross sectional view of two parallel tubes joined by a transverse tube according to the present invention.

FIG. 1 is a sectional view of a joining device generally designated 10 for joining together angularly disposed tubular members. A first and a second tubular member 12 and 14, respectively, are disposed parallel relative each other and are joined by a transverse tube 16. An anchoring means including a sleeve 18 defines a threaded bore 20 and is introduced into the first tubular member 12. The threaded bore 20 of the sleeve 18 is aligned with a first aperture 22 defined by the wall of the first tubular member 12. A rod 24 includes a protuberance or head 26 at one end of the rod and is threaded at 28, the end remote from the head 26. The threaded end 28 of the rod 24 cooperates with the threaded bore 20. Centering washers or spacers 30 and 32 are disposed, respectively, at each end of the transverse tube 16. Centering washers 30 and 32 fit tightly around the rod 24 or alternatively, may be fitted tightly within the tube 16. The transverse tube 16 has each end cut to match and conform to the external shape of the tubes 12 and 14. The head 26 of the rod 24 is introduced into the inside of the second tubular member 14 through a second aperture 34 defined by the wall of the second tubular member 14.

A wedge generally designated 36 is shown more specifically in FIGS. 2-6. The wedge 36 defines a longitudinal slot 38. The slot 38 is open ended towards the thinner end 40 of the wedge 36. The wedge 36 includes a curved surface 42 which generally conforms to and cooperates with the internal surface of the second tubular member 14 and a sloping wedge surface 44. The thinner end 40 of the wedge 36 includes a V-shaped guide 46 which extends from the thinner end 40 of the wedge to the open end 48 of the slot 38.

Figure 2:
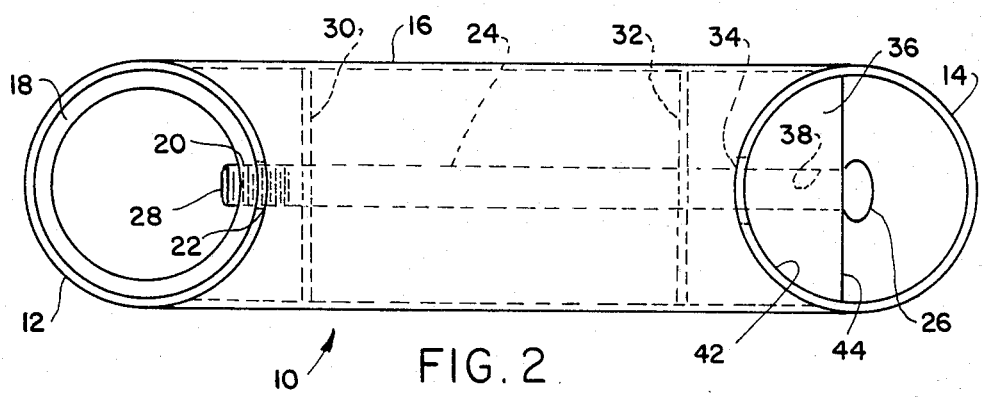
FIG. 2 is a top view of FIG. 1.
Figure 2A:
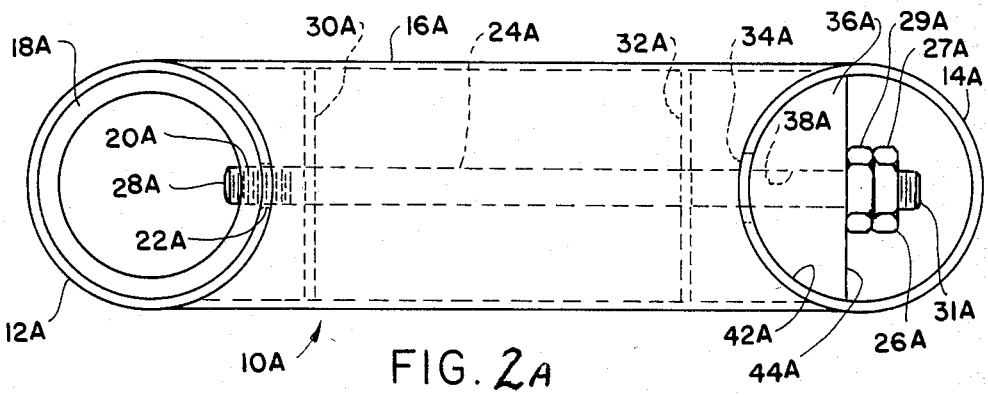
FIG. 2a is a top view of an alternative embodiment of the present invention.

FIG. 2a is an alternative embodiment to the present invention and shows a similar device to that shown in FIGS. 1 and 2 except in that the head generally designated 26a comprises two nuts 27a and 29a which threadably engage the threaded end 31a of the rod 24a. The nuts 27a and 29a are locked relative to each other at the end of the rod 24a remote from the anchoring means.

In use of the device, the sleeve 18 is inserted into the first tubular member 12 and the threaded bore 20 is aligned with the first aperture 22. The threaded end 28 of the rod 24 is threaded into engagement with the threaded bore 20 and the transverse tubular member 16 is slipped over the centering washers 30 and 32. Alternatively, if the washers are disposed integrally within the tube 16, the rod 24 is introduced through the central openings in the washers or spacers 30 and 32 and the threaded end 28 is engaged by the threaded bore 20. The protruding head 26 of the rod 24 is introduced through the second aperture 34 of the second tubular member 14 and the second tubular member 14 is held against the shaped end of the transverse tube 16 and the wedge 36 is inserted into one end of the second tubular member 14 with the thinner end 40 of the wedge 36 facing towards the head 26. The curved surface of the wedge 36 cooperates with the internal surface of the second tubular member 14. The wedge slides along the internal surface of the second tubular member 14 until the V-shaped guide 46 engages the rod 24. The guide 46 of the wedge and the rod 24 cooperate to guide the rod 24 within the slot 38. As the wedge 36 continues to move longitudinally relative the rod 24, the sloping wedge surface engages the head 26 of the rod 24. A sharp blow applied to the thicker end of the wedge 36 locks the parallel tubes 12 and 14 and the transverse tubes 16 together. The sharp blow applied to the wedge subjects the rod 24 to tension stress and conversely, subjects the transverse tube to compression stress.

The joining device is easily disassembled by applying a sharp blow to the thinner end 40 of the wedge 36. Such a blow releases the sloping wedge surface from engagement with the head 26.

In use of the alternative embodiment of the invention, the nuts 27a and 29a are locked relative each other to provide a head 26a. The remainder of the assembly procedure is the same as that applicable to the embodiment shown in FIGS. 1 and 2.

The joining device of the present invention provides a joint between angularly disposed tubular members that has an improved rigidity and ease of assembly over the prior art joining devices. Furthermore, the joining device of the present invention provides a significant improvement over the prior art joining devices because the wedge can easily be guided along the internal surface of the tubular member towards locking engagement with the rod. In the prior art devices, a spacer or bearing surface was interposed between the wedge and the internal surface of the tube and difficulties were encountered in guiding the wedge over this spacer into engagement with the cooperating slot.

The present disclosure contains that contained in the appended claims as well as that of the foregoing description. Although the invention has been disclosed in its preferred form with a certain degree of particularity, it is understood that the invention of the preferred form has been made by way of example, that numerous changes in the details of construction and the combination and arrangement of parts may be resorted to without departing from the spirit and scope of the invention.

What is claimed is:

1. A device for joining a transverse tubular member between two parallel members comprising in combination:

a first tubular member;

a second tubular member disposed parallel to said first tubular member;

a transverse tubular member extending between said first and second tubular members;

a first aperture defined by the wall of said first tubular member;

a rod extending through said first aperture;

anchoring means disposed within said first tubular member for anchoring one end of said rod;

a plurality of spacers disposed along the length of said rod, said spacers supporting said transverse tubular member relative to said rod;

a second aperture defined by the wall of said second tubular member;

a head disposed on said rod, said head being disposed at the end of said rod remote from said anchoring means;

a wedge disposed within said second tubular member for locking said head within said second tubular member when said head is introduced into said second tubular member through said second aperture;

said wedge defining a longitudinal slot, said slot being closed at one end such that when said wedge is introduced into said second tubular member said slot receivably engages said rod to urge a sloping wedge surface defined by said wedge into engagement with said head and to urge a curved surface defined by said wedge into engagement with the internal surface of said second tubular member; and said sloping wedge surface and said curved surface of said wedge being disposed between said head and the internal surfaces of said second tubular member such that said wedge interacts with said head for rigidly securing said first, second and transverse members together.

2. A device as set forth in claim 1 wherein said anchoring means is a sleeve disposed within said first tubular member, said sleeve defining a threaded bore which cooperates with a threaded end of said rod, said threaded end being remote from said head.

3. A device as set forth in claim 1 wherein said plurality of spacers are rigidly secured along the length of said rod.

4. A device as set forth in claim 1 wherein said plurality of spacers are rigidly secured within and along said transverse tubular member.

5. A device as set forth in claim 1 wherein said head is integrally formed with said rod.

6. A device as set forth in claim 1 wherein said head comprises two nuts which threadably engage the end of the rod remote from said anchoring means, said nuts being locked relative each other.

7. A device as set forth in claim 1 wherein said slot has a width slightly greater than the diameter of said rod such that said rod freely slides along the length of said slot.

8. A device as set forth in claim 1 wherein said open end of said slot is disposed at the thinner end of said wedge.

9. A device as set forth in claim 8 wherein said wedge further includes a V-shaped guide disposed at said thinner end of said wedge, said guide guiding said rod within said open end of said slot.

* * * * *